(12) United States Patent
Hathaway et al.

(10) Patent No.: US 11,751,581 B2
(45) Date of Patent: Sep. 12, 2023

(54) ULTRAVIOLET TREATMENT OF FOOD PRODUCTS TO KILL MICROORGANISMS WHILE RETAINING FRUIT BLOOM

(71) Applicant: Xenon Corporation, Wilmington, MA (US)

(72) Inventors: Ryan Hathaway, Lynn, MA (US); Roger Williams, Acton, MA (US); Saad Ahmed, Wilmington, MA (US)

(73) Assignee: Xenon Corporation, Wilmington, MA (US)

( * ) Notice: Subject to any disclaimer, the term of this patent is extended or adjusted under 35 U.S.C. 154(b) by 93 days.

(21) Appl. No.: 17/215,598

(22) Filed: Mar. 29, 2021

(65) Prior Publication Data

US 2021/0212330 A1 Jul. 15, 2021

Related U.S. Application Data

(62) Division of application No. 16/388,263, filed on Apr. 18, 2019, now Pat. No. 10,959,441.

(60) Provisional application No. 62/822,292, filed on Mar. 22, 2019, provisional application No. 62/659,390, filed on Apr. 18, 2018.

(51) Int. Cl.
*A23B 7/015* (2006.01)
*A23L 3/00* (2006.01)
*A23L 3/005* (2006.01)

(52) U.S. Cl.
CPC .............. *A23B 7/015* (2013.01); *A23L 3/001* (2013.01); *A23L 3/003* (2013.01); *A23L 3/005* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 4,871,559 A | 10/1989 | Dunn et al. |
| 5,034,235 A | 7/1991 | Dunn et al. |
| 5,364,645 A | 11/1994 | Lagunas-Solar et al. |
| 5,489,442 A | 2/1996 | Dunn et al. |
| 5,900,211 A | 5/1999 | Dunn et al. |
| 6,132,784 A | 10/2000 | Brandt et al. |
| 6,228,332 B1 | 5/2001 | Dunn et al. |
| 6,245,711 B1 | 6/2001 | Halbrook, Jr. |
| 6,453,145 B1 | 9/2002 | Miura |
| 6,492,645 B1 | 12/2002 | Allen et al. |
| 6,730,923 B1 | 5/2004 | May et al. |
| 7,234,586 B1 | 6/2007 | Newman |
| 7,638,780 B2 | 12/2009 | Kilburn et al. |
| 7,845,823 B2 | 12/2010 | Mueller et al. |
| 8,624,203 B2 | 1/2014 | Tullo et al. |
| 2002/0162971 A1 | 11/2002 | Koenck et al. |
| 2003/0145664 A1 | 8/2003 | Schwarz et al. |
| 2003/0198716 A1 | 10/2003 | Hankinson et al. |
| 2004/0028553 A1 | 2/2004 | Panico |
| 2007/0196235 A1 | 8/2007 | Shur et al. |
| 2008/0075629 A1 | 3/2008 | Deal et al. |
| 2009/0304880 A1 | 12/2009 | Kidder et al. |
| 2010/0007577 A1 | 1/2010 | Ninan et al. |
| 2010/0098874 A1 | 4/2010 | Schroder |
| 2010/0183779 A1 | 7/2010 | Felix |
| 2010/0223843 A1 | 9/2010 | Williams |
| 2011/0091579 A1 | 4/2011 | Hausman |
| 2012/0051046 A1 | 3/2012 | Jackson |
| 2012/0079950 A1 | 4/2012 | Schroeder |
| 2014/0042342 A1 | 2/2014 | Karim et al. |
| 2014/0227132 A1 | 8/2014 | Neister |
| 2015/0151014 A1 | 6/2015 | Vasilenko |
| 2018/0110890 A1 | 4/2018 | Matsui |
| 2018/0343898 A1 | 12/2018 | Alzeer et al. |
| 2019/0320670 A1 | 10/2019 | Hathaway et al. |
| 2020/0299069 A1 | 9/2020 | Ahmed |

FOREIGN PATENT DOCUMENTS

| | | |
|---|---|---|
| EP | 1020363 A2 | 7/2000 |
| WO | 02090114 A1 | 11/2001 |
| WO | 03061382 A1 | 7/2003 |
| WO | 2010105365 A1 | 9/2010 |
| WO | 2014026187 A3 | 2/2014 |

(Continued)

OTHER PUBLICATIONS

International Application PCT/US2020/24208, International Search Report and Written Opinion dated Jul. 28, 2020, 14 pgs.

(Continued)

*Primary Examiner* — Jyoti Chawla
(74) *Attorney, Agent, or Firm* — Leber IP Law; David C. Robertson

(57) ABSTRACT

Systems and methods for treating unwashed fruit with fruit bloom that provide a first ultraviolet (UV) energy with one or more flashes using a first set of one or more flash lamps to a first surface of each of a plurality of blueberries and provide a second UV energy with one or more flashes using a second set of one or more flash lamps to a second surface of each of the plurality of blueberries. The system determines a fruit bloom level associated with the plurality of blueberries after provision of the first and second UV energies and determines an adjustment to a parameter of at least one of the first and second UV energies based on the fruit bloom level. The system provides UV energy with the adjusted parameter to a subsequent set of blueberries to remove microorganisms from the blueberries while retaining fruit bloom.

11 Claims, 5 Drawing Sheets

(56) References Cited

FOREIGN PATENT DOCUMENTS

WO    2019204627 A1    10/2019
WO    2020198138 A1    10/2020

OTHER PUBLICATIONS

Bialka; et al., Abstract of Decontamination of *Escherichia coli* O157:H7 and *Salmonella enterica* on Blueberries Using Ozone and Pulsed UV Light, Journal of Food Science, vol. 72, Issue 9, 11 pages, first published Oct. 26, 2007, 11 pgs.
International Application PCT/2019/028156, International Search Report and Written Opinion dated Jul. 5, 2019, 8 pgs.

ULTRAVIOLET TREATMENT OF FOOD PRODUCTS TO KILL MICROORGANISMS WHILE RETAINING FRUIT BLOOM

CROSS REFERENCE TO RELATED APPLICATIONS

This application claims priority to U.S. Provisional Application No. 62/659,390, filed Apr. 18, 2018, entitled "Ultraviolet Treatment of Food Products to Kill Microorganisms While Retaining Fruit Bloom," and U.S. Provisional Application No. 62/822,292, filed Mar. 22, 2019, entitled "Flash Lamp System for Disinfecting Conveyors," and is a divisional application of U.S. patent application Ser. No. 16/388,263, filed Apr. 18, 2019 and now U.S. Pat. No. 10,959,441, entitled "Ultraviolet Treatment of Food Products to Kill Microorganisms While Retaining Fruit Bloom," each of the contents of which are incorporated herein in their entirety.

TECHNICAL FIELD

The present disclosure relates generally to light systems, and in particular, to systems and methods for treating food products using light systems.

BACKGROUND

Food products can be treated with ultraviolet (UV) light at appropriate wavelengths to kill contaminants. At wavelengths of about 260 nm-270 nm, UV alters molecular bonds within microorganismal DNA, producing thymine dimers that can kill or disable organisms, including bacteria and viruses.

Ultraviolet light radiation can be provided in a continuous manner with a mercury lamp, or with a xenon flash lamp. Flash lamps provide a broad band of UV light using short duration, high intensity flashes of light that includes light in the 260-270 nm range. One advantage of flash lamps is that they introduce less heat into the product being irradiated compared to mercury lamps. The ultraviolet energy can be provided with a flash lamp using one flash or a succession of flashes. Each flash introduces energy, and it is desired to have a certain minimum accumulated energy to break the molecular bonds in the DNA; that is, one can multiply the energy per flash times the number of flashes to reach a desired accumulated energy.

Some food products, particularly fruits, have a whitish substance on the outside, called a bloom. This bloom is a naturally occurring shield on blueberries, apples, grapes, pears, and certain other fruits. The bloom is considered safe to eat, and it can help preserve the fruit. But consumers often wash it off or remove it after purchasing, but before eating; for example, a person might wipe off an apple to "shine it" before eating. Some might mistakenly believe that the bloom is an insecticide or pesticide. The bloom can indicate freshness, particularly in blueberries, and it also helps to preserve freshness.

SUMMARY OF THE INVENTION

Systems and methods are disclosed herein for treating unwashed fruit with fruit bloom. In some embodiments, the system provides a first ultraviolet (UV) energy with one or more flashes using a first set of one or more flash lamps to first surfaces of each of a plurality of blueberries. In some embodiments, the system provides a second UV energy with one or more flashes using a second set of one or more flash lamps to second surfaces of each of the plurality of blueberries, wherein the first surfaces and the second surfaces are different. In some embodiments, the system determines a fruit bloom level associated with the plurality of blueberries after provision of the first UV energy and the second UV energy. In other embodiments, the system determines an adjustment to a parameter of at least one of the first UV energy and the second UV energy based on the fruit bloom level and provides UV energy with the adjusted parameter to a subsequent set of blueberries to deactivate microorganisms from the blueberries while retaining fruit bloom.

In some embodiments, the system moves the plurality of blueberries with a continuous motion relative to the first and second sets of flash lamps while providing the first and second UV energy. In other embodiments, the system determines a speed associated with the movement of the plurality of blueberries and determines an adjustment to the speed based on the microorganism level and the fruit bloom level. In some embodiments, the system rotates the plurality of blueberries after provision of the first UV energy to the plurality of blueberries and prior to the provision of the second UV energy to the plurality of blueberries. In some embodiments, the system determines a microorganism level associated with the plurality of blueberries after provision of the first UV energy and the second UV energy wherein determining the adjustment to the parameter is further based on the determined microorganism level. In some embodiments, the system determines the microorganism level and the fruit bloom level by inspecting at least one of a color profile associated with the plurality of blueberries, a shape profile associated the plurality of blueberries, and a temperature profile associated with the plurality of blueberries. In some embodiments, the system determines the adjustment to the parameter by comparing the microorganism level and the fruit bloom level to a threshold value and adjusting the parameter when the comparison in response to at least one of the microorganism level and the fruit bloom level has a value relative to the threshold value. In some embodiments, the system determines the fruit bloom level by inspecting at least one of a color profile associated with the plurality of blueberries, a shape profile associated the plurality of blueberries, and a temperature profile associated with the plurality of blueberries.

In other embodiments, the system's measured parameter includes at least one of a number of flashes and an energy density per flash. In some embodiments, the combination of the first UV energy and the second UV energy comprises multiple energy flashes, each flash having no more than a maximum per pulse energy density of 2 $mJ/cm^2$, the multiple energy pulses having an accumulated energy density of a minimum of 15 $mJ/cm^2$. In other embodiments, the combination of the first UV energy and the second UV energy comprises multiple energy flashes, each flash having no more than a maximum per pulse energy density of 5 $mJ/cm^2$, the multiple energy pulses having an accumulated energy density of a minimum of 30 $mJ/cm^2$. In other embodiments, the combination of the first UV energy and the second UV energy comprises multiple energy flashes, each flash having no more than a maximum per pulse energy density of 10 $mJ/cm^2$, the multiple energy pulses having an accumulated energy density of a minimum of 50 $mJ/cm^2$.

In some embodiments, the system includes a conveyor for transporting a plurality of blueberries, the conveyor comprising a first conveyor portion and a second conveyor portion, the first portion being elevated with respect to the second portion, such that the plurality of blueberries fall a vertical distance from the first conveyor portion to the second conveyor portion as they are transported from the first conveyor portion to the second conveyor portion and therefore rotate as they move from the first conveyor portion to the second conveyor portion. In other embodiments, the system includes a first light source associated with the first conveyor portion, the first light source for providing ultraviolet (UV) energy to a first surface of each of the plurality of blueberries. In some embodiments, the system includes a second light source associated with the second conveyor portion, the second light source for providing a second UV energy to a second surface of each of the plurality of blueberries. In other embodiments, the system includes an inspection scanner for determining inspection data associated with the plurality of blueberries, the inspection data indicating at least one of a microorganism level and a fruit bloom level associated with the plurality of blueberries after the provision of the first energy and the second energy to the plurality of blueberries. In other embodiments, the system includes a control system configured to receive first data including the inspection data, determine a difference between the first data and a threshold value, and determine an adjustment to a parameter of at least one of the conveyor portions, the first light source, and the second light source based on the difference such that a combination of the first energy and the second energy removes microorganisms from a subsequent set of blueberries while retaining fruit bloom.

In some embodiments, the system includes at least one first light source for providing a first ultraviolet (UV) energy to a first surface of each of a plurality of blueberries moving in a continuous motion relative to the at least one first light source. In other embodiments, the system includes at least one second light source for providing a second UV energy to a second surface of each of the plurality of blueberries moving in a continuous motion relative to the at least second light source, wherein the first surface and the second surface are different. In other embodiments, the system includes an inspection scanner for determining inspection data associated with the plurality of blueberries, the inspection data indicating at least one of a microorganism level and a fruit bloom level associated with the plurality of blueberries after the provision of the first energy and the second energy to the plurality of blueberries. In some embodiments, the system includes a control system configured to receive first data including the inspection data, determine a difference between the first data and a threshold value, and determine an adjustment to a parameter of the lamp system based on the difference such that a combination of the first energy and the second energy removes microorganisms from a subsequent set of blueberries while retaining fruit bloom. In some embodiments, the system includes a conveyor system for moving the plurality of blueberries in a continuous motion relative to the at least one first light source and the at least one second light source. In other embodiments, the conveyor system comprises a first portion associated with the at least one first light source, a second portion associated with the at least one second light source, and a turning portion positioned between the first portion and the second portion, the turning portion for rotating the plurality of blueberries. In some embodiments, the combination of the first energy and the second energy comprises multiple energy pulses, each energy pulse having no more than a maximum per pulse energy density of 2 mJ/cm$^2$, the multiple energy pulses having an accumulated energy density of a minimum of 15 mJ/cm$^2$. In other embodiments, the combination of the first energy and the second energy comprises multiple energy pulses, each energy pulse having no more than a maximum per pulse energy density of 5 mJ/cm$^2$, the multiple energy pulses having an accumulated energy density of a minimum of 30 mJ/cm$^2$. In other embodiments, the combination of the first energy and the second energy comprises multiple energy pulses, each energy pulse having no more than a maximum per pulse energy density of 10 mJ/cm$^2$, the multiple energy pulses having an accumulated energy density of a minimum of 50 mJ/cm$^2$. In some embodiments, the first data further includes a speed the plurality of blueberries move relative to the at least one first light source and the at least one second light source, and the parameter includes at least one of an intensity of the first energy, a number of energy pulses associated with the first energy, an intensity of the second energy, a number of energy pulses associated with the second energy, the speed the plurality of blueberries move relative to the at least one first light source and the at least one second light source.

In some embodiments, the system provides a plurality of flashes with a UV flash lamp to a set of blueberries having a natural fruit bloom, the flashes each having sufficiently low energy such that the natural fruit bloom substantially remains on the blueberries after the flashes have been provided, the plurality of flashes being sufficient in number to substantially deactivate a target microorganism. In some embodiments, the energy per flash provided to the blueberries is less than 5 mJ/cm$^2$ per flash, and the total energy provided to the blueberries is at least 15 mJ/cm$^2$. In other embodiments, the energy per flash provided to the blueberries is less than 10 mJ/cm$^2$ per flash, and the total energy provided to the blueberries is at least 30 mJ/cm$^2$. In other embodiments, the system monitors the amount of fruit bloom on the blueberries and in response to a reduction in an amount of the bloom remaining after UV energy is applied, reducing an amount of UV energy for a subsequent set of blueberries and increasing the number of flashes for the subsequent set of blueberries.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

With a flash lamp, it has been found that by using more pulses with less energy per pulse, an appropriate amount of energy can be delivered to the product to enhance freshness, or to kill or deactivate contaminants, but without removing the bloom from the product. Different contaminants require different levels of energy. For example, killing or deactivating viruses usually requires more energy than killing or deactivating bacteria.

The delivered energy is usually measured in millijoules per square centimeter (mJ/cm$^2$). It is desirable to deliver individual flashes that each have individual energy levels of less than about 10 mJ/cm$^2$ or 5 mJ/cm$^2$ or 2 mJ/cm$^2$ to not reduce the bloom, and to deliver a sufficient number of flashes to provide a minimum total accumulated energy of 15 mJ/cm$^2$, or at least 30 mJ/cm$^2$, or at least 50 mJ/cm$^2$. The total accumulated energy depends on an operator's goal of using the flash lamp system, e.g., the types of contaminants an operator desires to deactivate or kill.

An example of a system that can be used to provide UV light to fruits that have a bloom is described here in the context of a system for use with frozen food products, such as blueberries, but it could be used with any fresh or frozen food products. Further, the disclosed system can be used with fresh or frozen, unwashed food products that have a fruit bloom on the outer surfaces.

Figure 1:
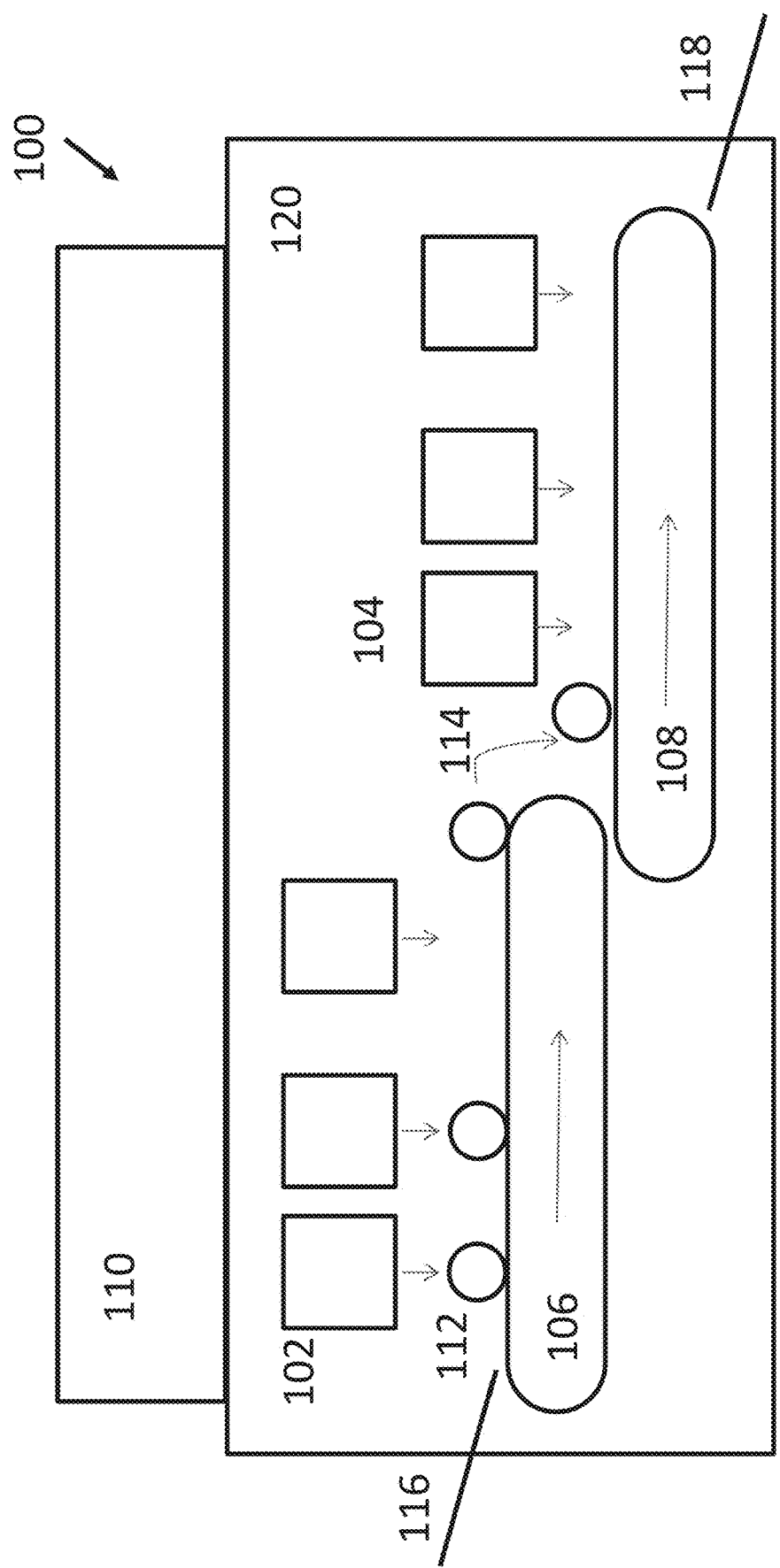
FIG. 1 is a system diagram of a lamp system for treating food products including two stacked conveyors, according to some embodiments of the present disclosure.

FIG. 1 is a system diagram of a lamp system for treating food products including two stacked conveyors, according to some embodiments of the present disclosure. FIG. 1 shows a first light source 102, a second light source 104, a first conveyor 106, a second conveyor 108, a heat extraction unit 110, food products 112, food product rotation 114, a delivery ramp 116, an output ramp 118, and a light tunnel 120.

Referring to the FIG. 1, this example of a flash lamp system 100 has a series of conveyors for transporting the food products through light tunnel 120 that has a chiller (not shown) and a heat extraction unit 110.

The food products 112 are brought in on a delivery conveyor located outside the light tunnel, and then provided to a delivery ramp 116. Delivery ramp 116 is preferably at an angle relative to horizontal. A vertical light skirt is provided at the opening of light tunnel 120 (not shown). Delivery ramp 116 and the light skirt reduce the amount of energy provided outside of the light tunnel 120, including to the products before they enter the light tunnel 120. As used herein, a conveyor can refer to a single belt or a system of belts with operational equipment, including a turning portion, a flipping mechanism, or any other rotational mechanism that can rotate food products one or more times such that energy from the first light source 102 and the second light source 104 is applied to the entire surface area of the food product. The first and second light source 102, 104 may comprise ultraviolet ("UV") lamps and are referred to as such herein for purposes of explanation.

The food products 112 enter the light tunnel 120 onto a first conveyor 106, where UV lamps 102, 104 provide energy to the food products 112. A chiller can be located in the light tunnel 120 under the first conveyor 106. Over the conveyors 106, 108 is a lamp housing with one or more lamps; as shown, in some embodiments a series of lamps, e.g., a bank of 6 lamps, is employed. The UV lamps 102, 104 are controlled by a control system and circuitry, including a capacitor, as shown and described in more detail in FIG. 4 below. The general process of causing the lamp to flash with a desired energy, pulse duration, and frequency is known, and is described in greater detail in U.S. Patent Application Publication No. 2014/0042342, entitled "Flash Lamps in a Continuous Motion Process," incorporated herein by reference in its entirety, also assigned to Xenon Corporation.

The food products 112 are then provided to second conveyor 108 located at a different vertical height relative to the first conveyor 106. The second conveyor 108 has a corresponding second chiller (not shown) and a second lamp 104 or bank of multiple lamps as shown. In some embodiments, the first and second conveyors 106, 108 can be horizontal and are vertically spaced apart. In this way, while travelling on both the first and second conveyors 106, 108 the food products 112 are in continuous motion relative to the UV lamps 102, 104 while within system 100.

As the food products 112 pass from the first conveyor 106 to the second conveyor 108, the food products 112 will tumble, shown as food product rotation 114, thus allowing different surfaces of the food products 112 to be exposed to the second lamp 104 located over the second conveyor 108. In some embodiments, the system 100 could have more than two conveyors, all at different vertical positions. As described in more detail below, food product rotation 114 can take on other forms, such as rollers or any other mechanism that can rotate the food product.

Each of the two banks of lamps 102, 104 can include six (6) sixteen-inch (40 cm) lamps, with accompanying housing and power supplies (not shown). The power supplies and control electronics can be located under the conveyor. The lamps can be elongated and straight, or spiral, or have some other configuration.

The conveyors 106, 108 can be commercially available, individual quick frozen (IQF) conveyors that freeze products quickly.

The system 100 can also include a heat extraction unit 110, such as an overhead plenum and air-cooling system, for the individual lamp housings, and with an ozone exhaust system. The system 100 also includes local hot air removal from around each of UV lamps 102, 104. There could be one system for removal located at the top as shown in FIG. 1, but multiple systems could be employed.

The system 100 includes a processing system with software for controlling the lamps to ensure uniform pulse coverage in a manner similar to that described in U.S. Patent Application Publication No. 2014/0042342, incorporated herein by reference in its entirety, also assigned to Xenon Corporation. As described there, a sequence of flashes can be designed based on inputs including the spacing of products, the spacing of lamps, the energy density provided with one lamp, the vertical height from food products to lamps, and the desired total energy density. Although the figures in U.S. Patent Application Publication No. 2014/0042342 do not show a window, in some embodiments of the present disclosure one or more windows could be provided under the UV lamps 102, 104 in some embodiments of system 100.

At the output of the light tunnel 120, a light skirt (not shown) helps to block UV energy from escaping. Also, at the output of the light tunnel 120 is output ramp 118. The output ramp 118 is preferably at an angle relative to the horizontal.

The system 100 includes a number of useful features for food products 112, including, for example, sloped delivery ramp 116, the arrangement of the multiple conveyors 106, 108 inside the light tunnel 120, the use of a vertical spacing between the conveyors, the use of a quick-freezing system in conjunction with the flash lamp system and use of heat extraction unit 110, and the use of vertical skirts on the input and output ends of the light tunnel 120.

Figure 2:
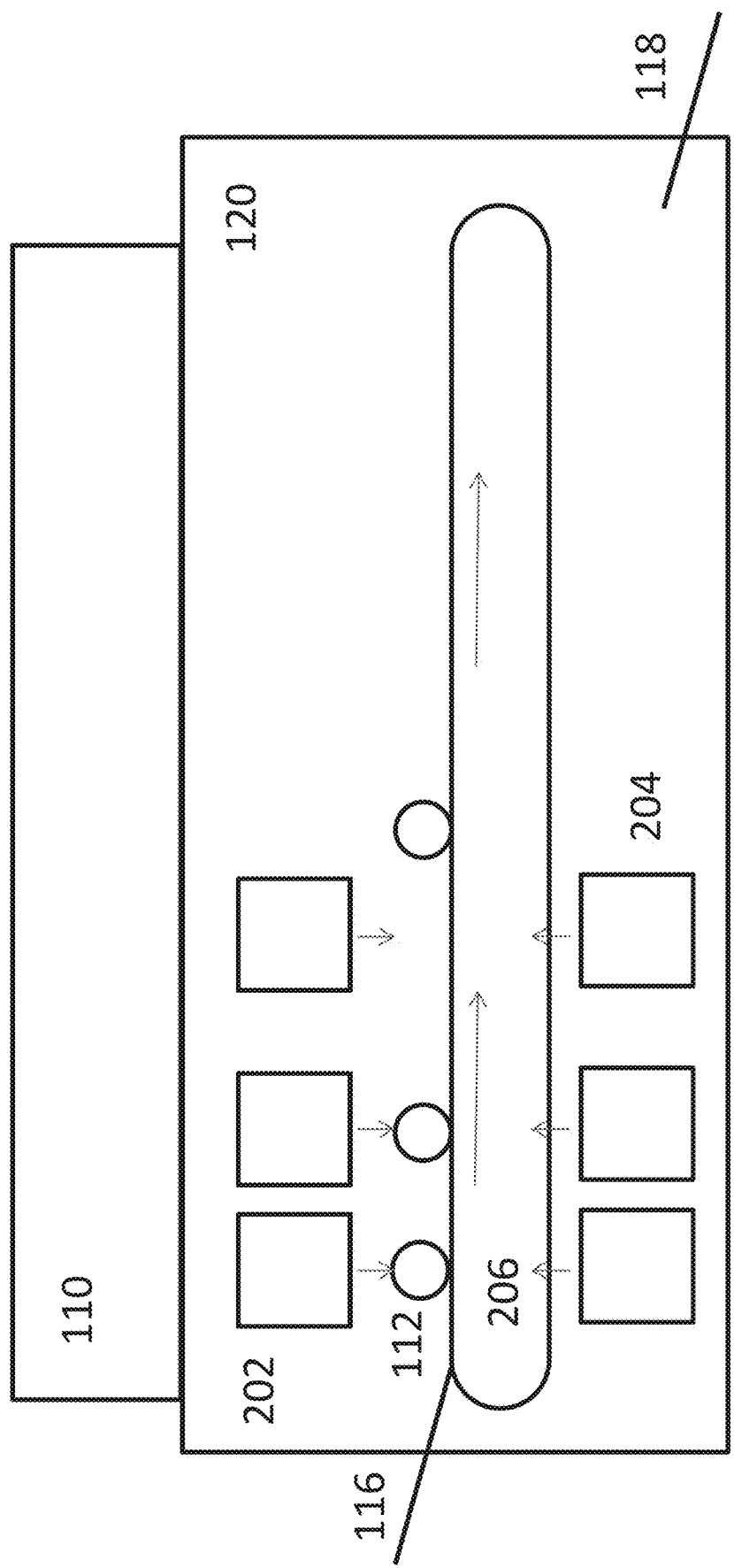
FIG. 2 is a system diagram of a lamp system for treating food products including one conveyer, according to some embodiments of the present disclosure.

FIG. 2 is a system diagram of a lamp system for treating food products including one conveyer, according to some embodiments of the present disclosure. FIG. 2 shows some of the same elements as shown in FIG. 1 and additionally shows a first light source 202, second light source 204, and conveyor 206.

Light sources 202, 204 are similar to light sources 102, 104 shown in FIG. 1. Like first light source 102, first light source 202 provides a first energy to food products 112. Second light source 204 is also similar to second light source 104, except that second light source 204 is positioned under conveyor 206 for providing energy upward to a second surface of the food product 112 at approximately the same time first light source 202 provides energy to first surface of the food product 112. In some embodiments, the first surface and the second surface of the food product 112 are substantially non-overlapping such that the entire surface of food product 112 receives energy from light sources 202, 204. Similar to system 100 described in FIG. 1, light source 202, 204 may comprise ultraviolet ("UV") lamps and are referred to as such herein for purposes of explanation. Conveyor 206 is preferably made of a material that is transparent to UV light. Because the entire surface area of each food product can be covered in UV light in the same conveyor portion, only one conveyor can be used in this embodiment. Other than the differences described with respect to FIG. 2, the description of conveyors 106, 108 applies to conveyor 206.

Figure 3:
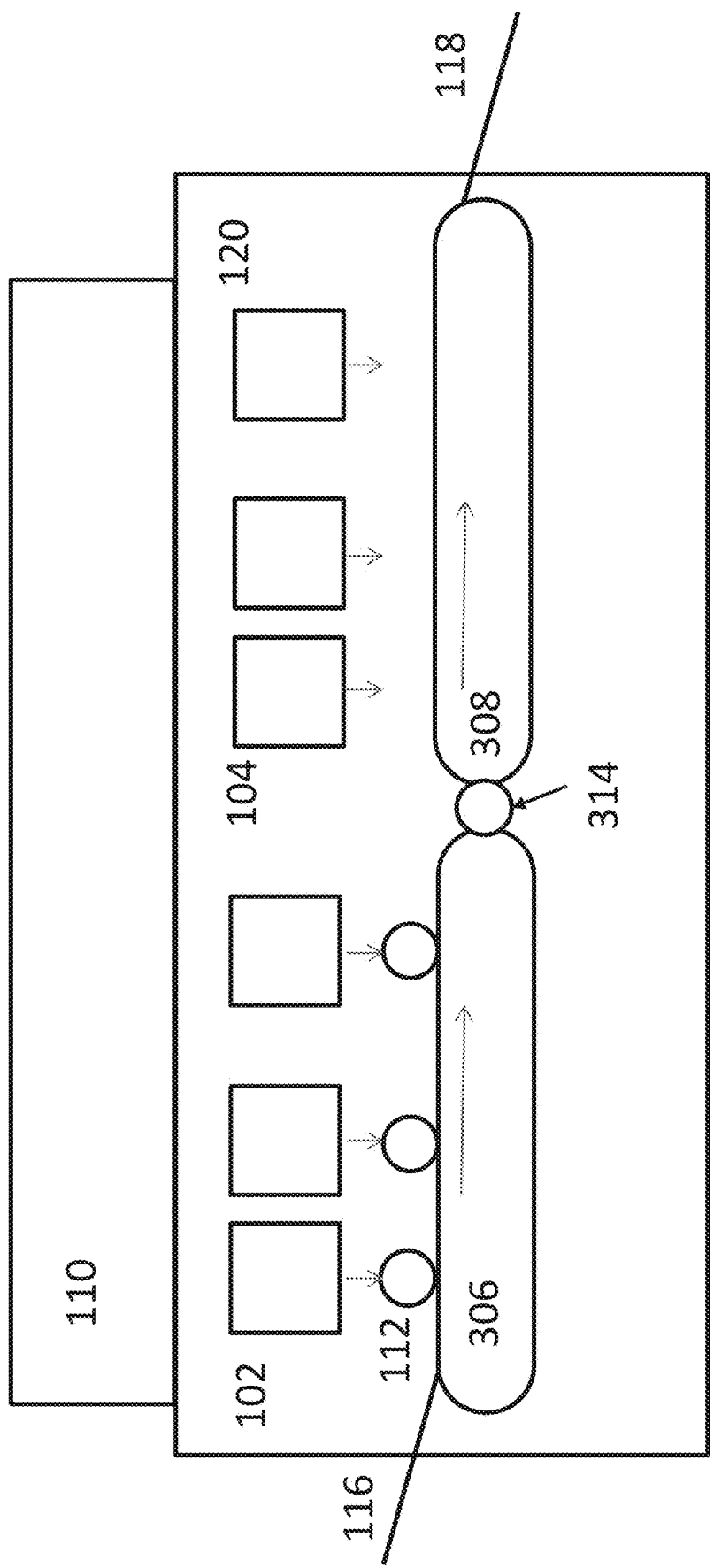
FIG. 3 is a system diagram of a lamp system for treating food products including two in-line conveyors, according to some embodiments of the present disclosure.

FIG. 3 is a system diagram of a lamp system for treating food products including two in-line conveyors, according to some embodiments of the present disclosure. FIG. 3 shows some of the same elements as shown in FIG. 1 and additionally shows a first conveyor 306, a second conveyor 308, and turning mechanism 314.

First conveyor 306 and second conveyor 308 are similar to first conveyor 106 and second conveyor 108 except that first conveyor 306 and second conveyor 308 are positioned at approximately the same height as one another. Rather than utilize a difference in height to rotate food products 112, a turning mechanism 314 is positioned between first conveyor 306 and second conveyor 308. Turning mechanism 314 can include one or more rollers or any other mechanism that can rotate the food products 112 to an angle that is approximately 180 degrees from its rotational position prior to turning mechanism 314. In some embodiments, additional turning mechanisms and conveyors can be used depending on a shape of the food product being transported. Depending on the number of turning mechanisms and conveyors employed, turning mechanism can rotate the food product to an angle greater or less than 180 degrees and/or rotate the food product along a different axis.

Figure 4:
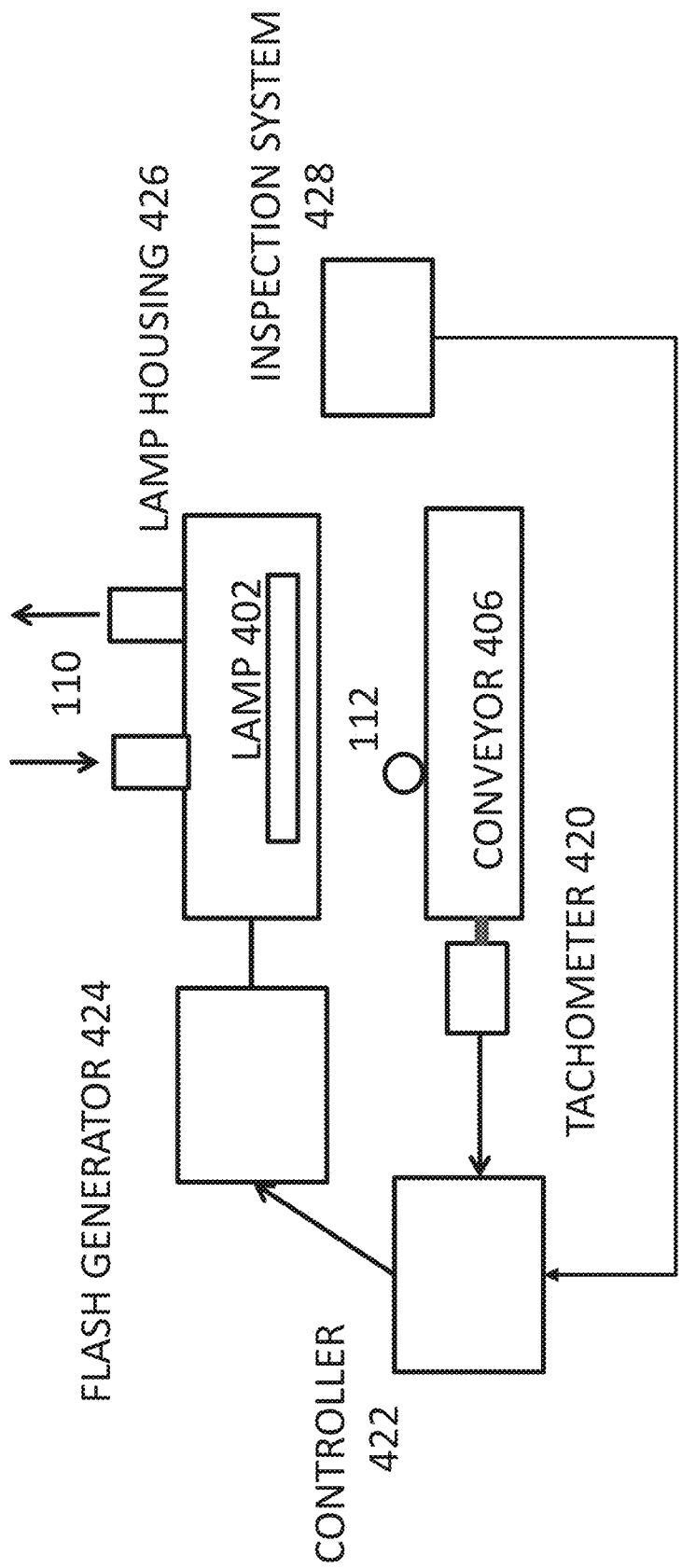
FIG. 4 is a system diagram of a lamp system for treating food products including a feedback mechanism, according to some embodiments of the present disclosure.

FIG. 4 is a system diagram of a lamp system for treating food products including a feedback mechanism, according to some embodiments of the present disclosure. FIG. 4 shows some of the same elements as shown in FIG. 1 and in additional lamp 402, conveyor 406, tachometer 420, controller 422, flash generator 424, lamp housing 426, and inspection system 428.

In some embodiments, a fruit treatment process may include the fruit product being inspected using inspection system 428 in a visual or automated manner to determine if a sufficient amount of bloom remains. This amount could be determined based on a human visual inspection or based on an automated inspection of the color, e.g., with inspection system 428 including a scanner. Inspection system 428 can also include a thermal camera that indicates which portions of the fruit product have been treated with energy from one or more of the light sources, such as lamp 402. For example, portions of the fruit product not treated with energy from one or more of the light sources may have a lower temperature profile than portions of the fruit products treated with energy. Inspection system 428 can also include imaging software for determining a color and/or shape of the fruit products after the fruit products have passed through the lamp system described herein. For example, portions of the fruit product that have received too much energy, and have lost fruit bloom, can be identified by examining a color profile of the fruit product. Similarly, excessive energy can also cause certain fruit product to change shape, which would also be detected via the inspection system 428.

In response to a scanned inspection, e.g., looking for a desired color or thermal image, controller 422 (also referred to as "control system" herein) can be used to manually or automatically adjust parameters of the system. Controller 422 can direct flash generator 424 to increase or decrease the energy density per flash, and the number of flashes from lamp 402. For example, if blueberries are inspected and the inspection determines that they are "too blue" by some amount (because the whitish bloom has been removed due to excessive energy applied), the system can reduce the energy per flash and potentially increase the number of flashes to achieve a more appropriate level of accumulated energy that maintains the bloom. Alternatively, the amount of energy per flash can be increased to allow a threshold amount of bloom to be removed if the inspection results in a determination that the blueberries are not sufficiently treated to kill viruses or bacteria.

The energy from the light source can be controlled by how much energy is applied to the one or more lamps, the type of lamp, the configuration of the lamp, the physical positioning of the lamp, and/or filtering that increases or decreases the attenuation of UV energy.

Controller 422 can also receive, via a tachometer 420, a speed of conveyor 406 to adjust lamp energy outputs based on the speed of the conveyor 406. Controller 422 may receive information regarding the speed at which conveyor 406 is circulating. Such information may include, among others, the number of rotations per second of conveyor rollers (not shown), the translational rate of conveyor 406 measured in distance divided by a unit time, or the number of food products 112 passing past a specific point of the system.

As described above, lamp 402 can also include a lamp housing 426 and cooling unit 110. Conveyor 406 can be any one or more of the conveyors shown and described in FIGS. 1-3. Lamp 402 can also be any one or more of the lamps shown and described in FIGS. 1-3.

The system can also employ components of the Z-1000 system (not shown) sold by Xenon Corporation, and useful for sterilization applications. Such system components may destroy microorganism's DNA using photochemical, photothermal, and/or photophysical mechanisms. The system may include modular components that include, for example, a sterilization chamber, single or dual-lamps, local or remote controllers, high voltage power supply, and a light intensity monitor, among others. In some embodiments, the sterilization chamber may include a removable lamp house and sample tray, ozone-resistant microbe filters at inlet and outlets of a ventilation path, and an interlocking door connected with safety interlock switches in the controller. The system may further, in other embodiments, a light intensity monitor coupled to the sterilization chamber and communicably coupled to the controller.

A process is thus provided for, in some embodiments, using flash lamps with a fruit product, such as blueberries, where an operator desires to kill bacteria and viruses without removing the naturally occurring bloom on exterior surfaces of the fruit.

The systems and methods described here can include the following: (1) A method for treating unwashed fruit having a fruit bloom with multiple flashes of UV light, including applying multiple energy pulses to the fruit, each pulse having no more than a maximum per pulse energy density, including 2 mJ/cm$^2$ or 5 mJ/cm$^2$ or 10 mJ/cm$^2$, with multiple pulses having an accumulated energy density with a minimum of 15 mJ/cm$^2$, or 30 mJ/cm$^2$, or 50 mJ/cm$^2$; (2) performing the method of (1) above, using a system having features shown in the Figure and described above, including one or more of a chiller in the conveyor, multiple displaced conveyors, multiple spaced banks of lamps, a sloped input ramp, and light skirts at the input and/or output of the conveyor system, a control system, and an inspection scanner; (3) performing the methods above, further including inspecting the treated fruit in a visual or automated manner to confirm a desired amount of bloom is present, and increasing or decreasing the energy per pulse based on the inspection.

Embodiments of the disclosed system can also include a system of the type with features shown in FIGS. 1-4 and described above, including one or more of a chiller in the conveyor, multiple displaced conveyors, multiple spaced banks of lamps, a sloped input ramp, light skirts at the input and/or output of the conveyor system, a control system, and/or an inspection scanner.

Figure 5:
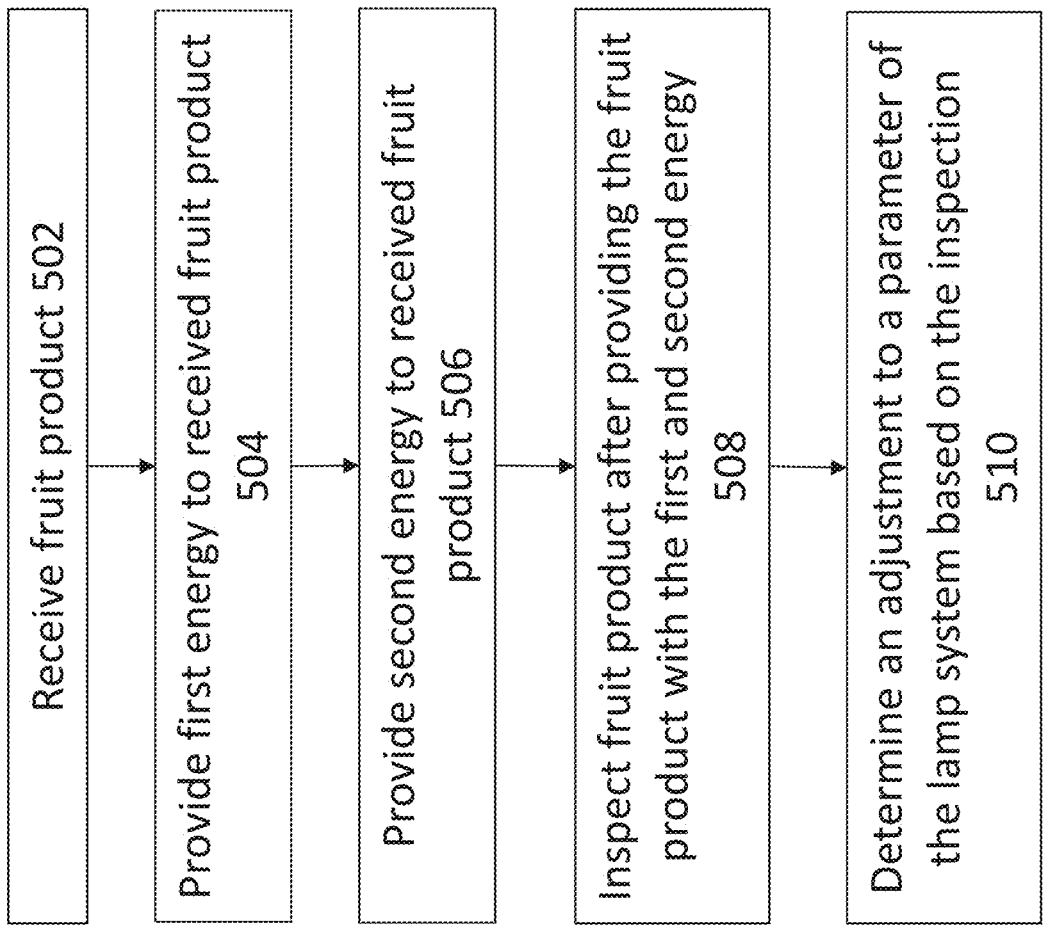
FIG. 5 is a flow chart showing a process for treating food products, according to some embodiments of the present disclosure.

FIG. 5 is a flow chart showing a process for treating food products, according to some embodiments of the present disclosure.

Referring to step 502, a fruit product, e.g., blueberries, is received into a light tunnel including a lamp system. The fruit product can be transported into the light tunnel via a conveyor system such as those described above in FIGS. 1-4.

Referring to step 504, a first energy is provided to the food product from a first light source of the lamp system. The first light source can be positioned over a first portion of a conveyor in the light tunnel. The first light source provides a first energy to a first portion of the fruit product. The first energy can include a single flash or multiple flashes. As described above, it can be desirable to deliver individual flashes that each have energy of less than about 10 mJ/cm$^2$ or 5 mJ/cm$^2$ or 2 mJ/cm$^2$ to not reduce the bloom on the food product, and to deliver a sufficient number of flashes to provide a minimum total energy of 15 mJ/cm$^2$, or at least 30 mJ/cm$^2$, or at least 50 mJ/cm$^2$. For example, 6 flashes at 5 mJ/cm2 of energy per flash can achieve a total of 30 mJ/cm2 for the portions irradiated by the UV energy.

Referring to step 506, a second energy is provided to the fruit product from a second light source of the lamp system. The second light source can be positioned over a second portion of the conveyor (as shown and described in FIGS. 1 and 3) or under a first portion of the conveyor (as shown and described in FIG. 2). The second light source provides a second energy to a second portion of the fruit product. Preferably the second portion of the fruit product includes a substantially different portion of the fruit product than the first portion, such that the entire surface area of the fruit product is treated by the energy of the first light source and the second light source. The second energy can include a single flash or multiple flashes. As described above, it can be desirable to deliver individual flashes that each have energy of less than about 10 mJ/cm$^2$ or 5 mJ/cm$^2$ or 2 mJ/cm$^2$ to not reduce the bloom, and to deliver a sufficient number of flashes to provide a minimum total energy of 15 mJ/cm$^2$, or at least 30 mJ/cm$^2$, or at least 50 mJ/cm$^2$.

Referring to step 508, the fruit product is inspected after the fruit product has been provided with the first and second energy. The inspection can include a thermal image, a color analysis, a shape analysis, or any other test to indicate a deviation from a desired amount of fruit bloom and/or a level of microorganisms removed from the fruit.

Referring to step 510, based on the inspection data from step 508, an adjustment to a parameter of the lamp system is determined. If the inspection data indicates that the fruit bloom and/or microorganism levels are within desirable limits, no adjustments are made. If the inspection data indicates that the fruit bloom and/or microorganism levels are not within desirable limits, the system can modify at least one of the first energy, second energy, and conveyor speed to achieve the desired level of the inspection data. For example, instead of 6 flashes at 5 mJ/cm2 each, use 10 flashes at 3 mJ/cm2 or 15 at 3 mJ/cm2.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A method for treating unwashed fruit with fruit bloom with a lamp system, the method comprising:
providing a first ultraviolet (UV) energy with one or more flashes using a first set of one or more flash lamps to first surfaces of each of a plurality of blueberries;
providing a second UV energy with one or more flashes using a second set of one or more flash lamps to second surfaces of each of the plurality of blueberries, wherein the first surfaces and the second surfaces are different;
determining a fruit bloom level associated with the plurality of blueberries after provision of the first UV energy and the second UV energy;
determining an adjustment to a parameter of at least one of the first UV energy and the second UV energy based on the fruit bloom level;
providing a first inspection scanner for determining first inspection data associated with a plurality of blueberries, the first inspection data indicating a microorganism level associated with the plurality of blueberries after the provision of the first UV energy and the second UV energy to the plurality of blueberries;
providing a second inspection scanner for determining second inspection data associated with a plurality of blueberries, the second inspection data indicating a fruit bloom level associated with the plurality of blueberries after the provision of the first energy UV and the second UV energy to the plurality of blueberries;
receiving first data including the first inspection data, receive second data including the second inspection data;
determining a first difference between the first data and a first threshold value;
determining a second difference between the second data and a second threshold value, and
determining the adjustment to a parameter of the lamp system based on the first difference and the second difference;
and
providing UV energy with the adjusted parameter to a subsequent set of blueberries to deactivate microorganisms from the blueberries while retaining fruit bloom;
wherein the combination of the first UV energy and the second UV energy comprises multiple energy flashes, each flash having no more than a maximum per pulse energy density of 2 mJ/cm2, the multiple energy pulses having an accumulated energy density of a minimum of 15 mJ/cm2; or
wherein the combination of the first UV energy and the second UV energy comprises multiple energy flashes, each flash having no more than a maximum per pulse energy density of 5 mJ/cm2, the multiple energy pulses having an accumulated energy density of a minimum of 30 mJ/cm2; or
wherein the combination of the first UV energy and the second UV energy comprises multiple energy flashes, each flash having no more than a maximum per pulse energy density of 10 mJ/cm2, the multiple energy pulses having an accumulated energy density of a minimum of 50 mJ/cm2.

2. The method of claim 1, further comprising moving the plurality of blueberries with a continuous motion relative to the first and second sets of flash lamps while providing the first UV and second UV energy.

3. The method of claim 2, further comprising:
determining a speed associated with the movement of the plurality of blueberries; and
determining an adjustment to the speed based on the fruit bloom level.

4. The method of claim 2, further comprising rotating the plurality of blueberries after provision of the first UV energy to the plurality of blueberries and prior to the provision of the second UV energy to the plurality of blueberries.

5. The method of claim 1, further comprising determining a microorganism level associated with the plurality of blueberries after provision of the first UV energy and the second UV energy, and wherein determining the adjustment to the parameter is further based on the determined microorganism level.

6. The method of claim 5, wherein determining the microorganism level and the fruit bloom level comprises inspecting at least one of:
   a color profile associated with the plurality of blueberries;
   a shape profile associated the plurality of blueberries; and
   a temperature profile associated with the plurality of blueberries.

7. The method of claim 5, wherein determining the adjustment to the parameter comprises:
   comparing the microorganism level and the fruit bloom level to a threshold value; and
   adjusting the parameter when the comparison in response to at least one of the microorganism level and the fruit bloom level has a value relative to the threshold value.

8. The method of claim 1, wherein determining the fruit bloom level comprises inspecting at least one of:
   a color profile associated with the plurality of blueberries;
   a shape profile associated the plurality of blueberries; and
   a temperature profile associated with the plurality of blueberries.

9. The method of claim 1, wherein the parameter includes at least one of a number of flashes and an energy density per flash.

10. A method comprising providing a plurality of flashes with a UV flash lamp to a set of blueberries having a natural fruit bloom, the flashes each having sufficiently low energy such that the natural fruit bloom substantially remains on the blueberries after the flashes have been provided, the plurality of flashes being sufficient in number to substantially deactivate a target microorganism,
   wherein the combination of a first UV energy and a second UV energy comprises multiple energy flashes, each flash having no more than a maximum per pulse energy density of 2 mJ/cm2, the multiple energy pulses having an accumulated energy density of a minimum of 15 mJ/cm2; or
   wherein the combination of the first UV energy and the second UV energy comprises multiple energy flashes, each flash having no more than a maximum per pulse energy density of 5 mJ/cm2, the multiple energy pulses having an accumulated energy density of a minimum of 30 mJ/cm2; or
   wherein the combination of the first UV energy and the second UV energy comprises multiple energy flashes, each flash having no more than a maximum per pulse energy density of 10 mJ/cm2, the multiple energy pulses having an accumulated energy density of a minimum of 50 mJ/cm2.

11. The method of claim 10, further comprising monitoring the amount of fruit bloom on the blueberries and in response to a reduction in an amount of the natural fruit bloom remaining after UV energy is applied, reducing an amount of UV energy for a subsequent set of blueberries and increasing the number of flashes for the subsequent set of blueberries.

* * * * *